Feb. 9, 1960      J. I. GREENBERGER      2,924,444
APPARATUS FOR WEIGHING WORKPIECES
Filed Dec. 3, 1953      2 Sheets-Sheet 1

INVENTOR.
JOSEPH I. GREENBERGER
BY
HIS ATTORNEY

Feb. 9, 1960    J. I. GREENBERGER    2,924,444
APPARATUS FOR WEIGHING WORKPIECES
Filed Dec. 3, 1953    2 Sheets-Sheet 2

INVENTOR.
JOSEPH I. GREENBERGER
BY
HIS ATTORNEY

United States Patent Office 2,924,444
Patented Feb. 9, 1960

2,924,444
APPARATUS FOR WEIGHING WORKPIECES

Joseph I. Greenberger, Pittsburgh, Pa., assignor to United Engineering and Foundry Company, Pittsburgh, Pa., a corporation of Pennsylvania Application December 3, 1953, Serial No. 395,876

2 Claims. (Cl. 265—72)

This invention relates to apparatus for weighing workpieces and, in particular, to the weighing of ingots, slabs, and the like prior to the rolling thereof.

In the process of rolling ingots, slabs and the like it is customary to weigh each workpiece at the beginning of the rolling operation, employing a scale for the purpose in combination with the feed table over which the workpiece is conveyed to the scale and stopped momentarily for weighing. The present apparatus for accomplishing this operation consists, in a general form, of a beam scale having a vertically movable platform supported and actuated by a toggle linkage arrangement which in turn is mounted upon a secondary platform supported by the scale parts connected to the beam. It is obvious that in this design in order to accommodate the weight of the entire weighing apparatus plus the weight of workpiece, the scale must be of such a large size that the manufacturing cost of the apparatus becomes prohibitive. Moreover, the objectionable normal inherent binding and frictional losses of the present toggle linkage combination are greatly increased as a result of the constant subjection of the moving parts to scale and and water whereby to affect seriously the accuracy of the weighing device.

It is, therefore, an object of this invention to provide a device for indicating the weight of a workpiece in which the weight responsive means is positioned closely adjacent the platform on which the object to be weighed is placed and is directly subject to the weight thereof.

It is another object of this invention to provide a plurality of diametrically opposed weight or pressure responsive elements arranged to support a workpiece engaging platform.

It is a further object of this invention to provide a weighing device which will be free from the inaccuracies inherent in known types of apparatus and which is much more economical to manufacture.

These objects, as well as various other novel features and advantages of this invention, will become apparent from the following description and accompanying drawings in which.

Figure 1:
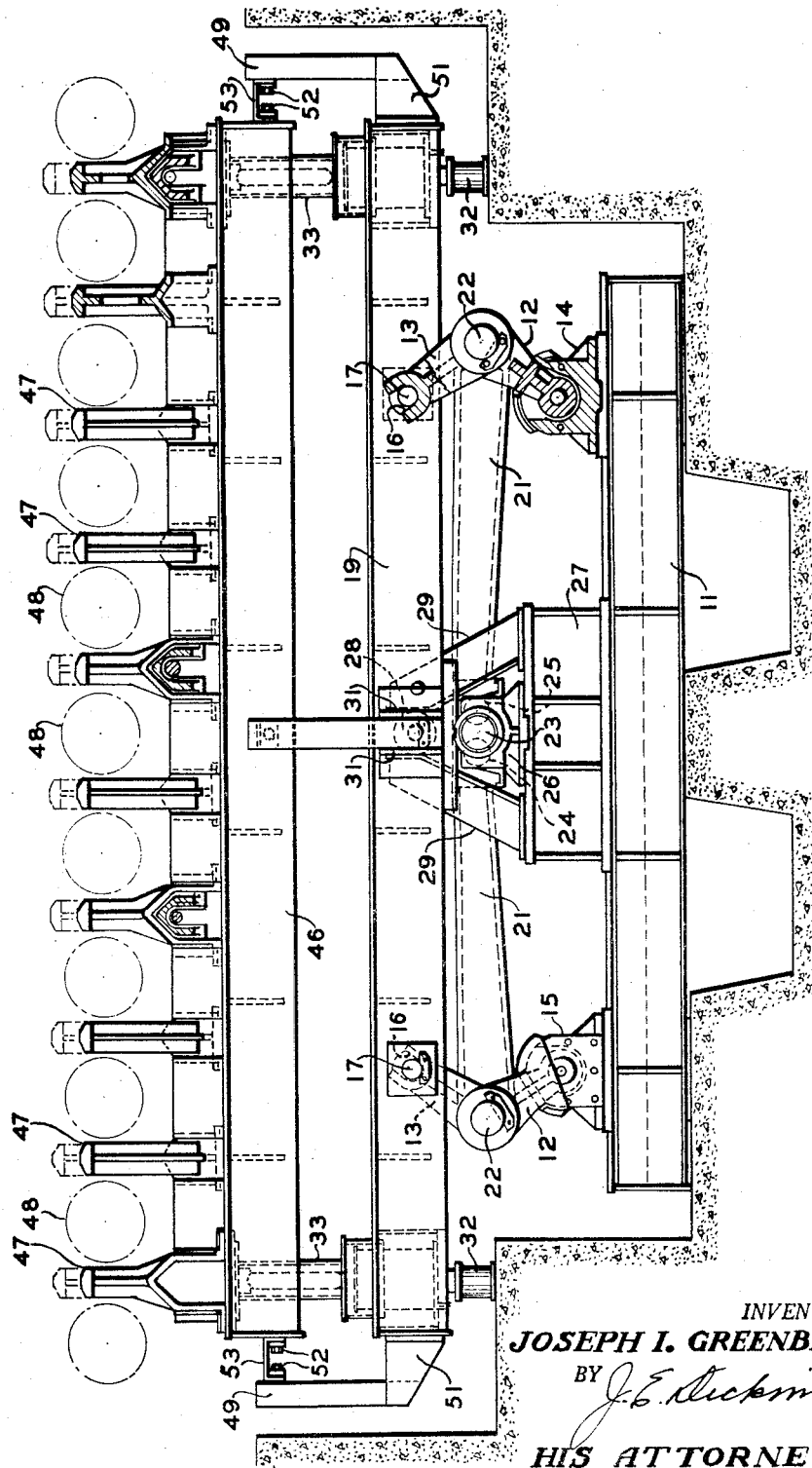
Fig. 1 is a side elevation of one embodiment of the herein disclosed invention.

With reference to the drawings, in Fig. 1 the weighing apparatus illustrated therein comprises a horizontally disposed base 11 mounted on a suitable foundation and upon which there are supported toggle mechanisms in the form of four links arranged to operate in pairs and consisting of arms 12 and 13 which are mounted on shafts 22 and pivotally secured to the base 11 by means of trunnion mountings 14 and 15. Arms 13 are provided with a U-shaped opening 16 for receiving four horizontally disposed pins 17 which are mounted within the sides of a vertically movable platform 19 arranged parallel to the base 11. The means provided for actuating the toggles comprises two horizontally disposed connecting links 21, one end of each of which is connected to the common shaft 22 interconnecting each respective pair of toggle arms 12 and 13. The other ends of the connecting links 21 are affixed to eccentric portions 24 and 25 of an eccentric shaft 23 which is housed in a bearing case 26 supported on an elevated stationary platform 27 centrally mounted on the base 11. The power means for rotating the eccentric shaft 23, although not shown, may be in the form of a reversible motor by which the eccentric shaft is rotated 90° to draw the toggle arms 12 and 13 substantially into an in-line relationship. In order to aid the toggle arms in guiding the platform 19 during its vertical movement, guide roller 28 is centrally arranged to engage the opposite vertical guiding surfaces 31 of a pair of upwardly extending inclined frames 29 secured to the stationary platform 27. The entire platform 19 is adapted to rest in its lower position on four stops 32 which are arranged to engage the four corners of the platform and which may be in the form of compression springs or the like.

Directly above the platform 19 there is a second platform 46 arranged parallel thereto and substantially of the same size and shape. This platform is provided with a plurality of vertical transversely extending fingers 47 which when in their lower positions are arranged to fit between table rollers 48 and at a level slightly below the tops of the rollers as shown in full lines and when in their raised positions to extend slightly above the rollers as indicated by broken lines in Fig. 1.

Figure 2:
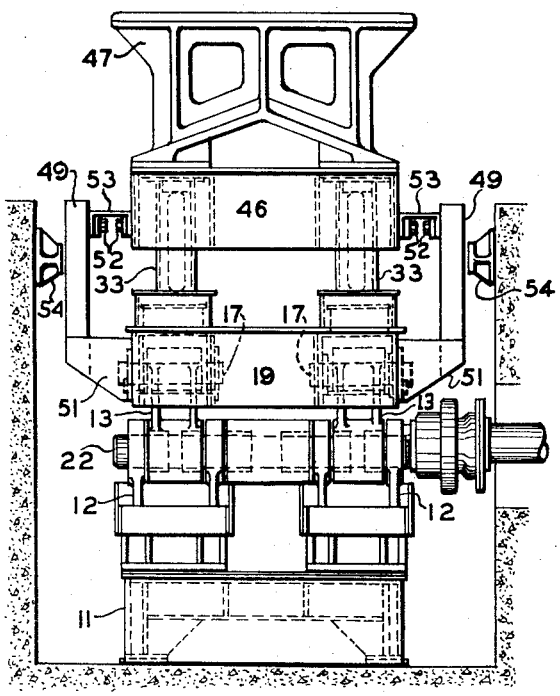
Fig. 2 is an end elevation of the device shown in Fig. 1.
Figure 3:
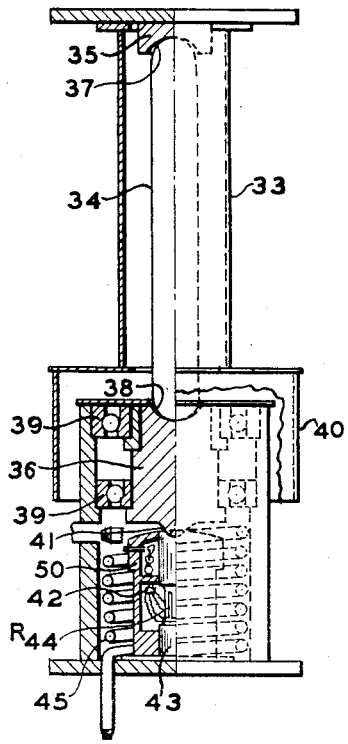
Fig. 3 is an enlarged partial sectional view of one of the pressure responsive elements.

It is one of the novel features of this invention to provide a plurality of pressure or weight responsive elements 33, as best seen in Fig. 3, which are placed between the two platforms 19 and 46, supporting and spacing the upper platform from the lower one. The present embodiment of this invention employs four of these elements arranged at the four corners of the movable platform 19 and consist generally of a vertically disposed compression rod 34 extending between two blocks 35 and 36 which are provided with centrally located recesses 37 and 38 for receiving the rounded ends of the rod 34. The lower block 36 is provided with a pair of thrust bearings 39 and is so shaped at the bottom as to present a small projecting portion 41 in direct vertical alignment with the compression rod 34. The projecting portion 41 is adapted to fit into a complementary recess of a pressure or weight responsive element 42 which is in the form of a load cell arranged directly beneath the lower block 36. The load cell 42 consists of a strain gauge in which there is provided a sensitive compression column 43 on which there is secured to the sides thereof a strain sensitive resistance element $R_{44}$ in the form of a plurality of U-shaped loops. It is to be observed that as the column is compressed, due to a load on the cell 42, there will be a decrease in the resistance of the element $R_{44}$, such decrease in resistance being a direct measure of the load imposed upon the column 43. Each element 33 is provided with a covering 40 to prevent any foreign matter such as scale, dust and the like from getting into the elements and affecting their accuracy. In addition, for each of the units a water cooling system is provided in the form of a coiled pipe 45 surrounding the outer casing 50 and through which water is continuously circulated at a constant temperature thereby maintaining the temperature of each cell constant, thus eliminating any inaccuracies which would otherwise be caused by temperature variations. So as to make certain that the compression rod 34 is maintained vertical, horizontal displacement of the platform 46 relative to the lower platform 19 is prevented by providing a plurality of vertical side members 49 arranged centrally at each end and on the sides and are secured to brackets 51 affixed to the lower platform 19. Between the upper ends of each of the members 49 and the platform 46, there is affixed by bolts 52 a flexible channel shaped spring 53. Inasmuch as the platform 46 when loaded will be depressed but a very slight amount, say on the order of a few thousandths of an inch, the spring 53 will permit such slight downward movement of the platform 46 during the weighing operations without affecting the accuracy of the device and yet resist horizontal displacement between the two platforms. To prevent sidewise tilting action of the two platforms two stops 54 are arranged adjacent the intermediate portions of two of the members 49 as shown in Fig. 2. In the operation of the present invention, it can be seen that as the platforms are elevated by the toggle mechanism and as the fingers lift the workpiece from the table, the weight thereof is directly received by the weight responsive elements at the four corners thereof without the necessity of having the reaction due to the weight of the object transmitted through a series of connecting links normally employed in commonly used platform scales.

Figure 4:
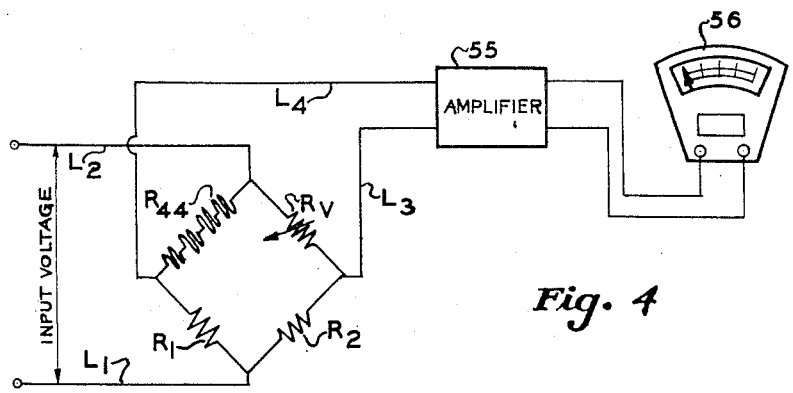
Fig. 4 is a schematic wiring diagram of the electrical circuit embodied in the invention.

For indicating the weight of a workpiece there is employed in combination an amplifier and a millivoltmeter connected to the pressure or weight responsive elements through a Wheatstone bridge circuit as shown in Fig. 4 of the drawings. The bridge comprises two legs consisting of equal resistance elements $R_1$ and $R_2$ and two legs within which there are connected respectively a variable resistance $R_v$ and a series of pressure or weight responsive resistance elements $R_{44}$. At diametrically opposite corners of the bridge two input lines $L_1$ and $L_2$ are connected and to the two remaining diametrically opposite corners of the bridge there are connected two output lines $L_3$ and $L_4$ which in turn are connected to an amplifier 55 having a millivoltmeter 56 on the output side thereof. The amplifier is of the type customarily employed for amplifying signals such as may be incorporated in a radio receiver and hence, since such amplifiers are well known in the art, it is considered that the details thereof need not be pointed out specifically. Though a millivoltmeter is shown in the particular embodiment which is calibrated to indicate measurements of weight directly, a recording instrument could very readily be interposed in the circuit if it is desired to obtain a permanent record of the weights of the workpieces.

Prior to the taking of weight measurements, the variable resistance $R_v$ of the bridge is varied to equal the resistance of the series connected pressure responsive elements $R_{44}$, thereby setting the millivoltmeter reading to zero and thus initially compensating for the weight of the upper platform 46 and the fingers 47. When a workpiece to be weighed is engaged by the fingers 47 and lifted from the table rollers 48 the resistance of the coils $R_{44}$ decreases in a direct proportion to the weight thereof thereby unbalancing the bridge, the amount of such unbalance being indicated by the millivoltmeter. As the millivoltmeter is first calibrated by employing different slabs of known weights, the weight of the workpieces can then be read directly from the millivoltmeter.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In a weighing system for indicating the weight of heavy workpieces, such as ingots, blooms, slabs and the like including means for positioning a workpiece above said system, a weighing device comprising a base disposed directly beneath a portion of said positioning means, a first platform arranged above and parallel to said base, actuating means supported by said base and connected to said first platform for raising said platform relative to said base, stop means arranged to engage said platform at the outer extremities thereof to maintain said platform in alignment, a Wheatstone bridge circuit including pressure sensitive variable resistance elements supported by said first platform and connected in series relationship to form one leg of said bridge circuit, means adjacent to said elements for maintaining the temperature thereof constant, a second platform parallel to said first platform and carried by said elements, means mounted on the upper surface of said second platform adapted to engage and lift a workpiece from said positioning means on vertical upward displacement of said platforms, and means connected to said bridge circuit for indicating directly the weight of a workpiece.

2. In a weighing system according to claim 1 in which at least four pressure sensitive variable resistance elements are provided and arranged at the four corners of said first platform.

References Cited in the file of this patent

UNITED STATES PATENTS

| | | |
|---|---|---|
| 964,854 | Epright | July 19, 1910 |
| 1,174,337 | Messiter | Mar. 7, 1916 |
| 1,268,197 | Winslow | June 4, 1918 |
| 1,407,078 | Murray | Feb. 21, 1922 |
| 1,968,988 | Bousfield | Aug. 7, 1934 |
| 2,002,411 | Moxley | May 31, 1935 |
| 2,358,770 | Carliss | Sept. 19, 1944 |
| 2,405,199 | Faust et al. | Aug. 6, 1946 |
| 2,472,047 | Ruge | May 31, 1949 |
| 2,555,233 | Hastings | May 29, 1951 |
| 2,647,741 | Wasko | Aug. 4, 1953 |
| 2,673,082 | Thurston | Mar. 23, 1954 |

FOREIGN PATENTS

| | | |
|---|---|---|
| 270,957 | Germany | Feb. 28, 1939 |
| 683,053 | Germany | Oct. 28, 1939 |